United States Patent

Bosch et al.

[15] 3,659,628
[45] May 2, 1972

[54] DISTRIBUTOR FOR CONTINUOUSLY OPERATING FUEL INJECTION SYSTEMS

[72] Inventors: Walter Bosch, Rommelshausen; Reinhard Schwartz, Stuttgart-Sillenbuch; Gerhard Stumpp, Stuttgart, all of Germany

[73] Assignee: Robert Bosch GmbH, Stuttgart, Germany

[22] Filed: Oct. 1, 1969

[21] Appl. No.: 862,875

[30] Foreign Application Priority Data

Oct. 15, 1968 Germany.....................P 18 03 066.5

[52] U.S. Cl.................................137/501, 123/33
[51] Int. Cl........................................F16k 21/00
[58] Field of Search ............137/501; 123/32.6, 33 A, 32 L, 123/33 G, 33 VG

[56] References Cited

UNITED STATES PATENTS

| 2,192,042 | 2/1940 | Hoffmann | 137/501 |
| 2,606,066 | 8/1952 | Thompson | 137/501 X |
| 2,807,144 | 9/1957 | St. Clair | 137/501 X |
| 3,054,393 | 9/1962 | Schmidt | 123/139 |
| 3,357,448 | 12/1967 | Martin | 137/501 |
| 2,659,425 | 11/1953 | Ifield | 137/501 X |
| 2,909,191 | 10/1959 | Horton | 137/501 |
| 3,051,195 | 8/1962 | Stenberg | 137/501 |

FOREIGN PATENTS OR APPLICATIONS

| 26,615 | 5/1911 | Great Britain | 137/501 |

Primary Examiner—M. Cary Nelson
Assistant Examiner—Robert J. Miller
Attorney—Edwin E. Greigg

[57] ABSTRACT

In a fuel distributor - in which the fuel to be delivered to a cylinder of an internal combustion engine is dosed by a metering valve - in order to maintain at a constant value the difference between the fuel pressure upstream of and downstream of the metering valve, there is provided a plurality of control valves (one for each cylinder) having a flat seat whose flow passage section is directly variable by a movable membrane. One side of said membrane is exposed to the downstream fuel pressure urging said membrane into a control valve opening direction, the other side of said membrane is exposed to the upstream fuel pressure urging said membrane into a control valve closing direction.

8 Claims, 2 Drawing Figures

Patented May 2, 1972

3,659,628

INVENTORS
Walter BOSCH
Reinhard SCHWARZ
Gerhard STUMPP

BY their ATTORNEY

DISTRIBUTOR FOR CONTINUOUSLY OPERATING FUEL INJECTION SYSTEMS

BACKGROUND OF THE INVENTION

This invention relates to a continuously operating fuel injection system for multi-cylinder, externally ignited internal combustion engines. The system is of the type that includes a distributor having metering valve means which, by virtue of controlled and simultaneous displacement, regulate the fuel quantities admitted to the fuel injection valves. In order to maintain a possibly constant pressure drop of the fuel across each metering valve in the fuel stream, there is disposed, for each metering valve, a control valve, the flow passage section of which is variable by a flexible membrane defining two chambers: in the first of the two chambers the pressure prevailing downstream of the metering valve urges the said membrane in an opening direction of the control valve, while the pressure prevailing upstream of the metering valve is admitted to the second of said chambers and urges the said membrane in a control valve closing direction.

It is a desideratum in fuel injection systems of the afore-outlined type to change the flow passage section of the fuel metering valves by means and as a function of a variable which itself changes in response to the operational conditions of the internal combustion engine. It is further sought to obtain, by means of an as constant pressure drop as possible through said flow passage section, a uniform, exact metering of fuel as a function of the magnitude of the flow passage section, whereby such metering is independent of the pressures downstream of or upstream of the metering valves.

In a known fuel injection system of the aforenoted type, such as disclosed in U.S. Pat. No. 2,785,669, the variation of the flow passage section of the metering valves is performed by axially displacing conical valve needles disposed in corresponding bores. If the valve needle is provided with a straight-sided conical head (as is most often the case), the relation between the displacement of the valve needle and the change in the flow passage section is quadratic. Stated in different terms, a doubling of the stroke of the valve needle causes a four-fold increase or a 75 percent decrease of the flow passage section, depending on which direction the valve needle is moved. If the side of the cone is arcuate, then the function of the change of the flow passage section is parabolic rather than quadratic. The disadvantage of such ratios resides in the fact that for a linear change of the flow passage section, the variable affecting the valve needle has to cause a quadratically or parabolically changing displacement thereof which in many cases (for example, when a space curve is used as the variable) gives rise to difficulties. It is a further disadvantage of all needle valves that for different flow passage sections the flow pattern changes very substantially at that location which leads to uncontrollable errors.

It is still another disadvantage of the aforenoted known fuel injection systems that the control valve, by means of which the pressure drop at the metering valve is to be maintained at an as constant value as possible, comprises a conical valve, the stem-like movable part of which is controlled by a membrane and is guided in a tube. Since the latter is relatively narrow, the valve may not operate in a hysteresis-free manner. Either the valve stem scrapes the wall of the guide tube or the fuel flowing between the tube and the stem affects the setting force directed to the valve stem. This hysteresis jeopardizes the effort to maintain the pressure drop constant at the metering valve. Such an effort is also disadvantageously affected by the conical seat of the control valve. A valve seat of this type requires a relatively large stroke of the movable valve member in order to fully open the valve which is necessary for rapidly obtaining the desired pressure difference. During this operation the closing spring of said conical valve has to be compressed to a substantial extent which causes a change in the spring force affecting the membrane that regulates the constant pressure drop. Consequently, it is not feasible to maintain the pressure drop at a constant value.

OBJECT AND SUMMARY OF THE INVENTION

It is a principal object of the invention to provide an improved fuel injection system in which the aforenoted disadvantages are eliminated.

According to the invention, the flow passage section of the metering valves is linearly variable by the axial displacement of a metering plunger and, further, the control valve is formed by a flat valve seat and a membrane directly controlling the flow passage section of the flat valve seat under the opposing forces of the fuel pressure upstream of and downstream of the metering valve.

The invention will be better understood, as well as further objects and advantages will become more apparent from the ensuing detailed specification of a preferred, although exemplary, embodiment taken in conjunction with the drawing.

DESCRIPTION OF THE PREFERRED EMBODIMENT

Figure 1:
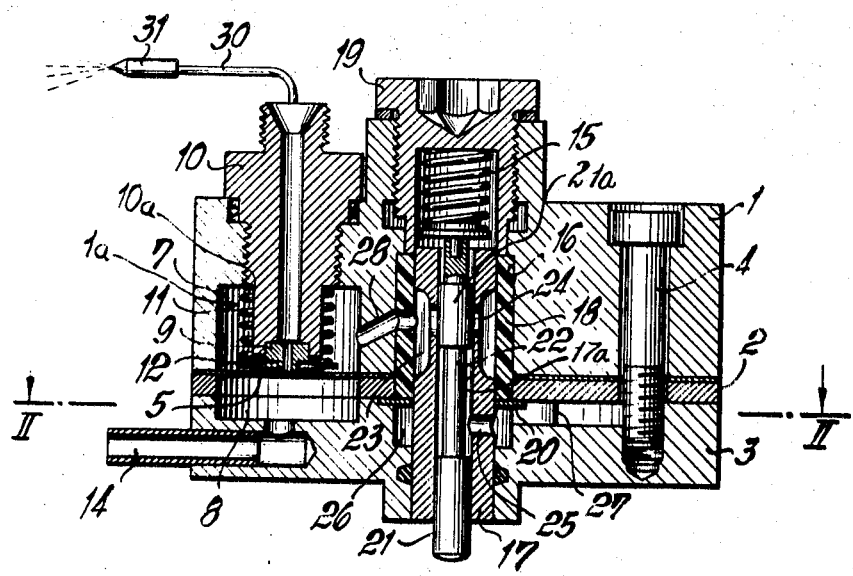
FIG. 1 is an axial sectional view of the preferred embodiment along line I—I of FIG. 2.

The distributor according to the invention comprises a housing 1, an intermediate plate 2 and a base closure 3, all tightened axially together by means of bolts 4. These assembled parts define a plurality of internal cavities generally indicated at 1a arranged concentrically with respect to the axis of housing 1 and spaced equidistantly from one another. Each cavity is formed of axially aligned bores provided in housing 1 and base closure 3. Between the housing 1 and the intermediate plate 2 there is clamped a metal foil or membrane 5 which passes radially through each cavity 1a dividing each into a chamber 7 and 8.

In each chamber 7, the membrane 5 forms with a stationary valve seat 9, the flat opening of which is disposed coplanar with the clamping plane of membrane 5, a membrane-type pressure drop control valve. The provision of a single membrane 5, circular portions of which form part of the separate, individual membrane-type control valves, is particularly advantageous in that the membrance member of each control valve has the same thickness and clamped with the same tension. Such characteristics are preconditions for an even operation of the distributor device.

Since in the presently described embodiment the distributor has four cavities 1a and hence four membrane valves, it is adapted to serve a four-cylinder engine.

The valve seat 9, which is a component machined with precision, is held in a valve seat holder sleeve 10 which, in turn, is threadedly secured in housing 1. The outer terminus of sleeve 10 serves as a nipple for a conduit 30 which leads to a fuel injection means, such as a fuel injection nozzle 31 associated with a cylinder of the internal combustion engine. A radial shoulder 10a of the sleeve 10 is engaged by one end of a coil spring 11 which preferably has a spring characteristic of flat course. The other end of the coil spring 11 engages a spring seat disc 12 which, in turn, is in engagement with the membrane 5 and urges the same away from valve seat 9. Thus, the membrane valve is open when inoperative. In case the membrane 5, in addition to its flexibility, has a sufficient resiliency, the coil spring 11 may be omitted. In such an event, in order to ensure that the valve is open when inoperative, the valve seat opening is not coplanar with the clamping plane of the membrane.

Figure 2:
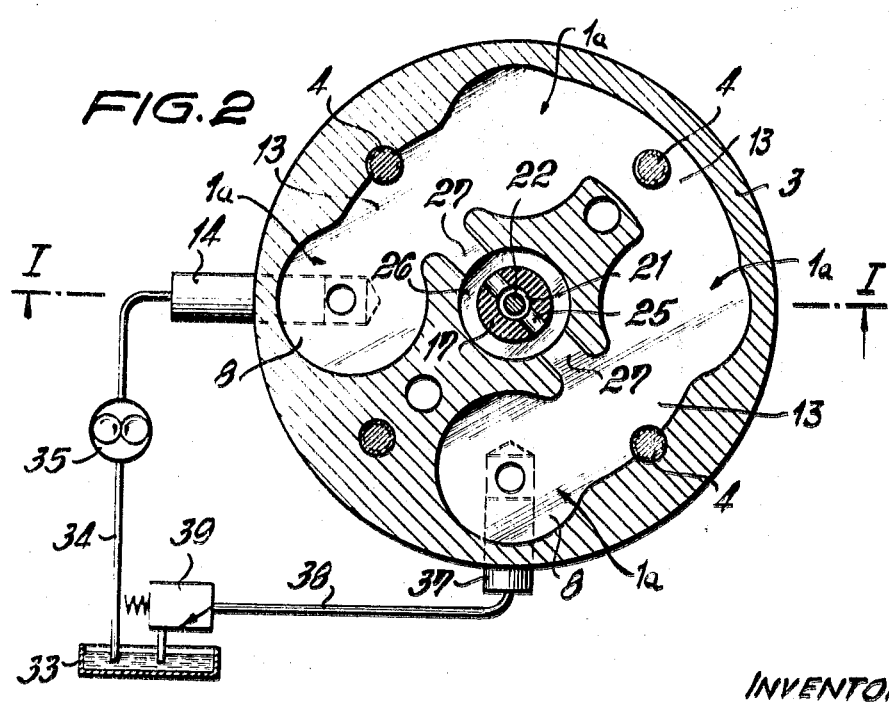
FIG. 2 is a cross-sectional view along line II—II of FIG. 1, showing the preferred embodiment connected to a fuel circuit illustrated diagrammatically.

Turning now to FIG. 2, base closure 3 is provided with an annular channel 13 interconnecting four chambers 8 in series in such a manner that the first chamber 8 may communicate only indirectly with the fourth chamber in the series through the second and the third chamber. From a fuel tank 33 there extends a conduit 34 through a continuously delivering fuel pump 35 to an inlet nipple 14 communicating with said first chamber 8. From the fourth or last chamber 8 of the series, there extends an outlet nipple 37 to which there is attached a conduit 38 leading through a pressure maintaining valve 39 back to the fuel tank 33.

In an axial bore 16 extending through the entire distributor 5 there is disposed a bearing sleeve 17 surrounded along a part of its length by an elastic (e.g. rubber) packing sleeve 18 securing the bearing sleeve 17 against axial or angular displacement. The packing sleeve 18 is axially compressed by means of a plug 19 urging it against a disc 20 clamped between the base closure 3 and the intermediate plate 2. Thus, in addition to fixedly securing the bearing sleeve 17 in the bore 16, the packing sleeve 18 also ensures that no fuel may leak between the bearing sleeve 17 on the one hand and the housing 1 and intermediate plate 2 on the other hand.

In the axial bore 17a of the bearing sleeve 17 there is disposed a metering plunger 21 which is axially displaceable therein against the force of a spring 15 and which is provided with a metering or control land 21a and a relatively wide, annular, circumferential groove 22 adjoining the land 21a. The external face of bearing sleeve 17 is provided with longitudinal grooves 23 which communicate with the axial cylindrical bore 17a of the bearing sleeve 17 through accurately identical, axially parallel, longitudinal metering slots 24. Depending upon the axial position of the metering plunger 21, the control land 21a thereof uncovers a shorter or longer portion of the metering slots 24 for communication with the groove 22.

The bearing sleeve 17 is further provided with radial ports 25 which establish a continuous communication between the annular groove 22 of plunger 21 and an annular channel 26. The latter is formed in the base closure 3 as the lower terminal portion of axial bore 16 and is defined by portions of the bearing sleeve 17 and the disc 20. From annular channel 26 there extend, in a substantially radial direction, channels 27 to the annular channel 13 thus establishing communication between annular channel 26 and chambers 8. The longitudinal grooves 23 of the bearing sleeve 17 communicate with chambers 7 through ports 28. Thus, with each membrane valve there is associated a longitudinal groove 23 with its metering slots 24. Further, the chambers 7 are separated from one another.

OPERATION OF THE PREFERRED EMBODIMENT

The continuously operating fuel pump 35 draws the fuel from the fuel tank 33 through the conduit 34 and delivers it through inlet nipple 14 to the chambers 8 serially connected by annular channel 13. One part of the fuel returns to the fuel tank 33 through outlet nipple 37, conduit 38 and pressure maintaining valve 39. During the course of this circulating fuel flow, the small air bubbles which may accumulate under the membrane 5 in each chamber 8 are carried away.

The other part of the fuel flows to the annular channel 26 through channels 27 which are of sufficient length to have some stabilizing effect on the fuel stream. Certain pressure losses in annular channel 13 may not be avoided during such a fuel flow. It is a precondition for an even fuel metering to provide a fuel pressure in the annular channel 26 that has a mean value between the higher inlet pressure at the downstream end of inlet nipple 14 and the lower outlet pressure at the upstream end of outlet nipple 37. For obtaining such a mean pressure, the channels 27 branch off from annular channel 13 at radially opposed locations thereof whereby the distance between one branch of channel 27 and the downstream terminus of inlet nipple 14 is identical to the distance between the other branch of channel 27 and the upstream terminus of outlet nipple 37.

From the annular channel 26, a part of the fuel flows through the radial ports 25 into the annular groove 22 of the metering plunger 21. From the annular groove 22 the fuel, controlled by the metering slots 24 (the flow passage section of which depends upon the axial position of control plunger 21) flows into the longitudinal grooves 23 and therefrom, through ports 28 into each chamber 7 in which a membrane valve is disposed.

The stiffness of the membrane 5 and the force of the spring 11 are designed in such a manner that in case of a deviation from a predetermined pressure drop between the fuel pressures prevailing in chambers 7 and 8 of a membrane control valve, the flow passage section between the membrane and valve seat 9 continuously changes until said predetermined pressure drop is again obtained. By virtue of a valve structure described hereinbefore, the duration of such change of the flow passage section is extremely short because even a small displacement of the membrane changes said flow passage section substantially. Because of the small displacement of the membrane 5, the force of spring 11 associated with each membrane control valve changes only slightly. Consequently, the control of the pressure drop proceeds in a very accurate manner or, stated in other terms, the pressure drop is substantially constant and thus independent of the flow rate of fuel delivered to injection nozzles 31.

What is claimed is:

1. In a continuously operating fuel injection system for multi-cylinder internal combustion engines, including a distributor of known type that has (A) arbitrarily and simultaneously operable metering valve means to determine the fuel quantities to be admitted to fuel injection means forming part of said system, (B) at least one first and adjoining second chamber receiving, respectively, fuel under pressure from upstream of and downstream of said metering valve means and (C) control valve means serving to maintain constant the pressure drop of fuel through said metering valve means, the improvement comprising, A. conduit means associated with each second chamber and connecting the latter with a fuel injection means,
  B. a flat valve seat disposed in the upstream end of said conduit means and forming the stationary part of said control valve means,
  C. a membrane separating each first chamber from an adjoining second chamber and forming the movable part of said control valve means, said membrane cooperating directly with said flat valve seat, said fuel pressure upstream of said metering valve means and prevailing in said first chamber, adapted to urge said membrane towards said flat valve seat to decrease the flow passage section of said conduit means, said fuel pressure downstream of said metering valve means and prevailing in said second chamber, adapted to urge said membrane away from said valve seat to increase the flow passage section of said conduit means,
  D. means defining a bore forming part of said metering valve,
  E. means for introducing fuel under pressure into said bore,
  F. means defining a plurality of axial, parallel metering slots at least equaling the number of said second chambers, each metering slot communicating with said bore and with one of said second chambers and
  G. a metering plunger forming part of said metering valve and slidably disposed in said bore, said metering plunger having a metering land uncovering to a greater or lesser extent said metering slots depending upon the axial position of said metering plunger in said bore, the change in the area of the uncovered portion of each metering slot being linearly proportionate to the axial displacement of said metering plunger.

2. An improvement as defined in claim 1, wherein said metering valve means further includes a bearing sleeve containing said bore and said metering slots; said metering plunger is provided with a circumferential groove adjoining said metering land and communicating with the uncovered portion of said metering slots.

3. An improvement as defined in claim 2, including an elastic packing sleeve disposed between said bearing sleeve and a bore provided in said distributor, means axially compressing said packing sleeve to outwardly seal said bearing sleeve and immobilize it in said last-named bore.

4. An improvement as defined in claim 1, including clamping means securely positioning said membrane, a spring disposed in each said second chamber and having a flat spring characteristic, said spring urging said membrane away from the opening of said flat valve seat, said opening is disposed coplanar with the clamping plane of said membrane.

5. An improvement as defined in claim 1, wherein said metering valve means is disposed centrally and axially of said distributor, said control valve means comprises a plurality of control valves, one disposed in each second chamber, said control valves are disposed about said metering valve means in a circular array, said membranes are part of a single foil member clamped into said distributor and disposed normal to its longitudinal axis.

6. An improvement as defined in claim 2, wherein said first chambers are interconnected in series by channel means, said system includes a fuel tank and means for introducing fuel under pressure into said channel means, one part of the fuel is adapted to be returned to said fuel tank from said channel means, the other part of the fuel is adapted to be admitted to said groove of said metering plunger from said channel means.

7. An improvement as defined in claim 6, wherein fuel is admitted from said channel means to said groove of said metering plunger through radial channels extending from at least the beginning portion and the end portion of said channel means.

8. An improvement as defined in claim 7, wherein said distributor comprises a housing, an intermediate plate and a base closure held together as a unit, said channel means is provided in said base closure in the form of a groove covered by said intermediate plate, said foil member is clamped between said housing and said intermediate plate; said housing, said intermediate plate and said base closure include aligned bores, each last named bore defines a first chamber and an adjoining second chamber.

* * * * *